(12) United States Patent
Brunnett et al.

(10) Patent No.: US 12,425,710 B1
(45) Date of Patent: Sep. 23, 2025

(54) INSERT MOLDED OPTICS HOLDER

(71) Applicant: Apple Inc., Cupertino, CA (US)

(72) Inventors: Justin C Brunnett, Danville, CA (US);
Martin J Auclair, Campbell, CA (US);
Nicholas D Smyth, San Jose, CA (US);
Scott W Miller, Los Gatos, CA (US);
Jason T Weaver, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 17/934,181

(22) Filed: Sep. 21, 2022

Related U.S. Application Data

(60) Provisional application No. 63/248,383, filed on Sep. 24, 2021.

(51) Int. Cl.
H04N 23/55 (2023.01)
H04N 23/51 (2023.01)
H04N 23/54 (2023.01)
H04N 23/68 (2023.01)

(52) U.S. Cl.
CPC ............. *H04N 23/55* (2023.01); *H04N 23/51* (2023.01); *H04N 23/54* (2023.01); *H04N 23/686* (2023.01)

(58) Field of Classification Search
CPC ........ H04N 23/55; H04N 23/51; H04N 23/54; H04N 23/686; H04N 23/57; H04N 23/56; H04N 23/73; H04N 23/45; G02B 13/0065; G02B 13/0075; G02B 13/009; G02B 13/004; G02B 27/0068; G02B 7/1821; G02B 27/0955; G02B 27/0972; G02B 7/021; G02B 7/04; G02B 1/041; G03B 5/00; G03B 2205/0007; G03B 13/36; G03B 2205/0069; G03B 17/17; G03B 2205/0015; G03B 17/04; G03B 30/00; G03B 11/045; G03B 19/22; G03B 11/04; G03B 11/043; G03B 11/041
See application file for complete search history.

(56) References Cited

U.S. PATENT DOCUMENTS 5,311,367 A 5/1994 Ohki et al.
6,799,902 B2 10/2004 Anderson et al.
8,339,502 B2 12/2012 Kawazu
9,420,155 B2 8/2016 Brodie et al.
(Continued)

OTHER PUBLICATIONS

U.S. Appl. No. 17/934,174, filed Sep. 21, 2022, Justin C. Brunnett, et al.

*Primary Examiner* — Abdelaaziz Tissire
(74) *Attorney, Agent, or Firm* — Robert C. Kowert; Kowert, Hood, Munyon, Rankin & Goetzel, P.C.

(57) ABSTRACT

A camera may include an optical components holder to hold optical components (e.g., one or more lenses and a light folding element) of the camera. The optical components holder may be formed using an insert-molding processor including a metal frame. One portion of the metal frame may form an upper wall of a portion of the optical components holder that holds the light folding element. Another portion of the metal frame may be at least partially exposed from a side wall adjacent the upper wall of the portion of the optical components holder. In addition, the camera may include a protection structure to protect the optical components holder from colliding with another component of the camera or a mobile multipurpose device.

20 Claims, 15 Drawing Sheets

(56) References Cited

U.S. PATENT DOCUMENTS

| | | | |
|---|---|---|---|
| 10,481,410 B2 | 11/2019 | Kim et al. | |
| 10,670,879 B2 | 6/2020 | Goldenberg et al. | |
| 10,962,737 B2 | 3/2021 | Hu et al. | |
| 11,016,264 B2 | 5/2021 | Tseng et al. | |
| 2005/0041300 A1* | 2/2005 | Oshima | G03B 17/14 |
| | | | 359/642 |
| 2009/0153985 A1* | 6/2009 | Nagaoka | G02B 7/1805 |
| | | | 359/733 |
| 2011/0026915 A1* | 2/2011 | Baik | H04N 23/57 |
| | | | 396/529 |
| 2015/0212337 A1 | 7/2015 | Nomura | |
| 2019/0049687 A1* | 2/2019 | Bachar | G02B 27/646 |
| 2019/0361323 A1* | 11/2019 | Jerby | G02B 27/646 |
| 2020/0125139 A1 | 4/2020 | Fletcher | |
| 2020/0251049 A1 | 8/2020 | Morris | |
| 2021/0063731 A1 | 3/2021 | Chang et al. | |
| 2021/0168229 A1 | 6/2021 | Kallman et al. | |
| 2021/0266465 A1* | 8/2021 | Wang | G02B 13/0065 |
| 2022/0196993 A1* | 6/2022 | Liao | G02B 5/22 |

\* cited by examiner

INSERT MOLDED OPTICS HOLDER

This application claims benefit of priority to U.S. Provisional Application Ser. No. 63/248,383, entitled "Insert-Molded Optical Components Holder of a Camera," filed Sep. 24, 2021, and which is hereby incorporated herein by reference in its entirety.

BACKGROUND

Technical Field

This disclosure relates generally to a camera and more specifically to structure(s) designed for holding optical components of a camera.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. Some cameras may include complicated optical components to provide desired image capturing functions and qualities. However, the optical components may add to the dimension of a camera, e.g., a thickness along an axis. In addition, a camera including the optical components may be subject to unwanted motion, e.g., an accidental drop from the hands of a user. During such events, the optical components may experience sudden movement with a large acceleration, which could cause damages to the optical components especially when they have a large mass. Thus, it is desirable to have structure(s) designed for holding the optical components of a camera to address these issues.

Figure 1A:
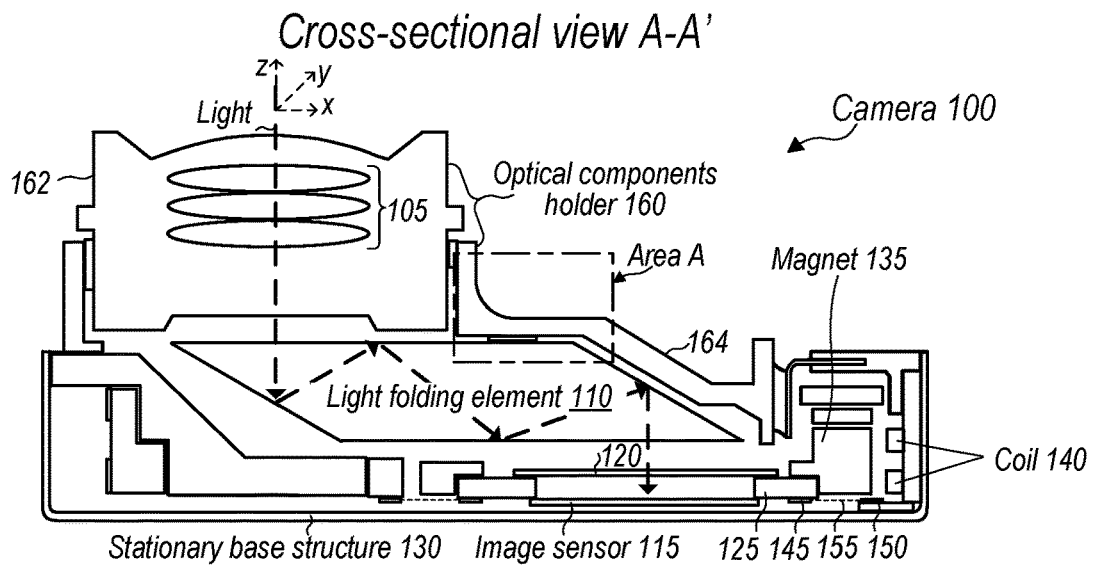
FIGS. 1A-1C show an example camera using an insert-molded holder to hold optical components, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to structure(s) of a camera designed for holding optical components of the camera. In some embodiments, the camera may include one or more lenses and a light folding element, collectively referred to as optical components. The one or more lenses may receive light from an external environment of the camera. The light folding element may fold the light that passes through the lenses, e.g., to change or re-direct a transmission path of the light, to an image sensor of the camera. The image sensor may in turn generate image signals, e.g., electrical signals, which may be further processed by a processor to render an image. In some embodiments, the light folding element may be a parallelogram prism. Alternatively, in some embodiments, the light folding element may have a different geometry shape, e.g., a triangle prism, even a reflective mirror, etc. In some embodiments, the camera may be integrated as part of a mobile multipurpose device such as a smartphone, a tablet, a pad device, and the like.

In some embodiments, the camera may include one or more structures to hold the foregoing optical components. In some embodiments, the one or more structures may be one single piece of structure to hold the lenses and the light folding element. Alternatively, in some embodiments, the one or more structures may include multiple separate pieces, e.g., a first piece to hold the lenses and a second piece to hold the light folding element. For purposes of illustration, in this disclosure the one or more structures will be described as including two pieces joined together as an example. Either case, the one or more structure(s) for holding the optical components may be referred to as optical components holder in this disclosure. In some embodiments, the holder for holding the optical components may be formed using an insert molding process. For instance, a pre-formed metal frame of a certain shape and/or dimension may be inserted into a mold and then molded together with plastics to form the holder. One benefit of using the insert molding approach is the reduction of the dimension of the optical components holder, which may ultimately lead to a size reduction of the camera. For instance, in some embodiments, a portion of the metal frame may form an upper wall of a portion of the structure that holds the light folding element, as described in more detail in the following sections. In some embodiments, in contrast to other designs that use plastics to form at least this upper wall of the holder, use of (a portion of) the metal frame to form the upper wall may allow the thickness (or height) of the upper wall to be reduced by several-hundred microns.

In addition, in some embodiments, the metal frame may also extend in to one or more side walls (adjacent the upper wall) of the portion of the holder that holds the light folding elements. In some embodiments, the portion of the metal frame in at least one of the side walls may be at least partially exposed from that side wall (e.g., visible from outside the side wall). As a result, the exposed portion of the metal frame may be used as a bonding surface to bond the optical components holder with another component of the camera, e.g., another stationary component of the camera to fix at least the portion of the holder that holds the light folding element. In some embodiments, the corresponding bonding surface of the other component of the camera may also be a metal frame. Thus, in contrast to other holders using plastics, it may now be possible to use a metal-to-metal adhesive (rather than metal-to-plastic adhesives) to obtain a stronger bonding connection between the optical components holding holder and the other component. Alternatively, the exposed portion of the metal frame may be used as the bonding surface to attach the light folding element to the optical components holder. In some embodiments, the light folding element may be made of glass. Thus, compared to plastic holders requiring plastic-to-glass adhesives, it may now be able to use a metal-to-glass adhesive to bond the light folding element with the holder to get a stronger attachment.

In some embodiments, the optical components holder may be attached with the other component of the camera at a plurality of positions using compliant mounts, and stiffness of the compliant mounts at the plurality of positions may be determined based on a mass distribution of the optical components holder and the optical components held within the optical components holder, so as to provide balanced movement of the one or more lenses and the light folding element during an accelerated event. For instance, when the optical components holder is attached with the other component of the camera at two locations, the compliant mounts at the two locations may not necessarily be both rigid connections, but rather possess certain levels of flexibility. Thus, during unwanted moving events, e.g., an accidental drop from the hands of a user, the one or more lenses and the light folding element may move approximately linearly with respect to one another, e.g., for a same distance towards a same direction. As a result, the light folding element may stay relatively stationary to the one or more lenses, such that the two may not collide with each other to cause damages.

The stiffness of the compliant mounts at the plurality of positions may be adjusted in various appropriate ways. For instance, in some embodiments, the optical components holder may be attached with the other stationary component of the camera at two positions, and at each position the attachment may be implemented using a metal-to-metal bonding between a metal frame of the optical components holder and another metal frame of the component. Accordingly, the stiffness at the two positions may be determined, according to the mass distribution of the optical components holder and the optical components within the optical components holder, based on an adjustment of the respective thickness of the metal frame of the other component of the camera and/or the metal frame of the optical components holders at the two positions. For instance, when the mass distribution of the optical components holder and the group of optical components is probably at a geometric center of the optical components holder, the thickness of the metal frame of the other component of the camera at the two positions may be approximately the same to provide approximately the same stiffness. Alternative, when the mass distribution leans to the left, the stiffness of the metal frame at the left may be larger than that of the metal frame at the right. In other words, a portion of the metal frame at the attachment on the right may be "softer" than another portion of the metal frame at the attachment on the left. In either case, a primary purpose may be to maintain the gravity center of the optical components holder and the group of optical components at approximately the same position during movement. As a result, a relative position between the one or more lenses and the light folding element may stay approximately unchanged, and the two may not collide with each other to cause damages.

In some embodiments, the camera may include a protection structure to protect the optical components holder from colliding with another portion of the camera or the mobile multipurpose device (e.g., a smartphone, a tablet, a pad device, and the like) as part of which the camera is integrated, e.g., another portion of the camera or the mobile multipurpose device above the optical components holder, during the unwanted moving events. In some embodiments, the protection structure may include a stroke limiter positioned between the optical components holder and the portion of the camera or the mobile multipurpose device that the optical components holder is protected from colliding with. Thus, when the optical components holder moves towards that portion of the camera or the mobile multipurpose device, the stroke limiter may stop the movement of the optical components holder ahead of a collision with the portion of the camera or the mobile multipurpose device. Alternatively, in some embodiments, the protection structure may include one or more foams placed between the optical components holder and the portion of the camera or the mobile multipurpose device. As a result, when the optical components holder moves unexpectedly towards the camera portion, the foams may serve as a stopper to stop the optical components holder before it collides with the portion of the camera or the mobile multipurpose device.

In some embodiments, the camera may include an autofocus (AF) function whereby the object focal distance between the optical components and the image sensor may be adjusted, e.g., along an optical axis of the optical components. In addition, in some embodiments, the camera may include an optical image stabilization (OIS) function that may sense and react to external excitation or disturbance by adjusting the relative position between the image sensor and the optical components, e.g., in one or more directions orthogonal to the optical axis. In some embodiments, the AF and/or OIS functions may be implemented using a sensor-shift design, using which the image sensor may be movable relative to the optical components in the foregoing directions. In some embodiments, the sensor-shift design may include a "floating" image sensor mounting structure that may suspend the image sensor from another stationary component of the camera, thus providing degrees of motion freedom for the image sensor. In addition, the motion of the image sensor may be controlled using one or more actuators, e.g., one or more voice coil motor (VCM) actuators.

Figure 1B:
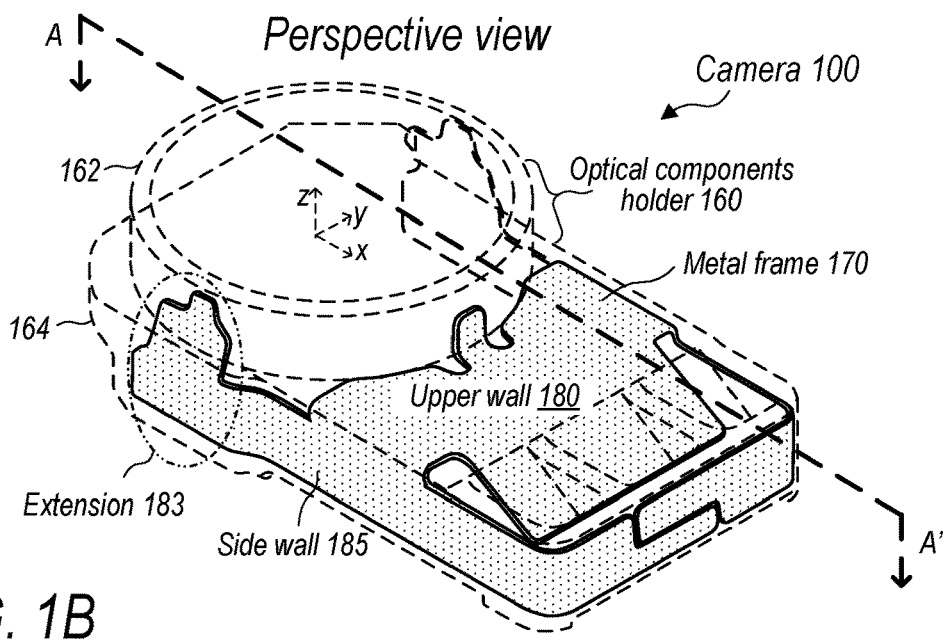
Figure 1C:
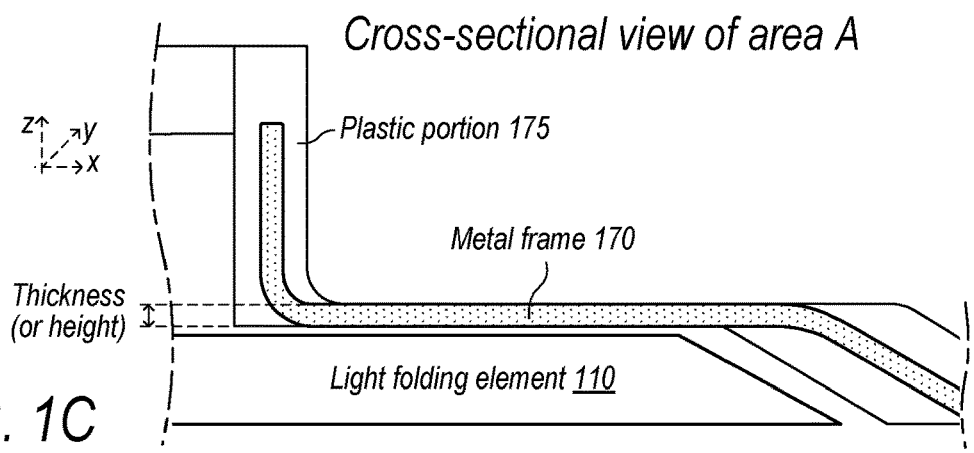

FIGS. 1A-1C show an example camera using an insert-molded structure to hold optical components, according to some embodiments. For purposes of illustration, a coordinate system defined by X-Y-Z axes is also displayed in FIG. 1, where an optical axis of the optical components is defined as the Z-axis. In some embodiments, the optical axis (or Z-axis) may correspond to the transmission path of a principal light ray passing through one or more lenses of the camera. In some embodiments, the transmission path of the principal light ray within the camera may not necessary be a straight but rather a folded line, e.g., folded by a light folding element of the camera. In that case, the optical axis (or Z-axis) may refer to a straight portion of the folded transmission path. Further, for purposes of illustration, only relevant components of the camera are shown in the figures.

As indicated in FIG. 1A, camera 100 may include one or more lenses 105, light folding element 110, and image sensor 115. In this disclosure, the lenses 105 and light folding element 110 may be collectively referred to as optical components. In this example, light folding element 110 may be placed optically between lenses 105 and image sensor 115, such that light folding element 110 may fold light that passes through lenses 105, e.g., change or redirect the transmission direction of the light, to image sensor 115. Alternatively, in some embodiments, light folding element 110 may be placed optically in front of lenses 105 along the transmission path, such that light from external environment into camera 110 may be first folded by light folding element 110, and then pass through lenses 105 to image sensor 115. As indicated in FIG. 1A, light folding element 110 may be a parallelogram prism. Alternatively, light folding element 110 may have a different geometry shape, such as a triangle prism, a reflective mirror, etc., to provide the designed light folding function. In some embodiments, camera 100 may further include infrared cutoff filter 120, which may be placed optically in front of image sensor 115 to block infrared light from reaching image sensor 115.

In some embodiments, camera 100 may include optical components holder 160 for holding the optical components, e.g., lenses 105 and light folding element 110. In this example, optical components holder 160 may include two separate pieces 162 and 164, two of which may be joined or attached together. The first piece 162 may be used to contain lenses 105, whilst the second piece 164 may be used to hold light folding element 110. Alternatively in some embodiments, optical components holder 160 may be a component of one single integral piece. In some embodiments, optical components holder 160 may be affixed with, directly or indirectly, another component of camera 100, such as stationary structure 130 of camera 100. As a result, optical components holder 160 and the optical components (e.g., lenses 105 and light folding element 110) within optical components holder 160 may stay fixed, or at least not supposed to move, during normal operations of camera 100.

Note that during unwanted moving events, optical components holder 160 and the optical components may still move unexpectedly.

In some embodiments, camera 100 may include AF and/or OIS functions. To implement the AF and/or OIS functions, camera 100 may include a sensor-shift design with which image sensor 115 may be movable relative to the optical components of camera 100. For instance, as indicated in FIG. 1A, image sensor 115 (and infrared cutoff filter 120) may be mounted on to substrate 125. In some embodiments, substrate 125 may include one or more printed circuit boards (PCBs). In some embodiments, substrate 125 may be suspended from stationary structure 130 via a suspension structure. For instance, the suspension structure may include an inner frame 145 attached with substrate 125, an outer frame 150 attached with stationary structure 130, and one or more flexure arms 155 connecting inner frame 145 with outer frame 150. Flexure arms 155 may have a certain level of elasticity such that they can stretch or compress approximately along the X- and/or Y-axis in the X-Y plane orthogonal to the optical axis (or Z-axis). As a result, substrate 125 (and image sensor 115) may be "floated" relative to stationary structure 130, but also movable relative to stationary structure 130 (and the optical components such as lenses 105 and light folding element 110) approximately along the X- and/or Y-axis. Further, camera 100 may include at least one actuator, e.g., a VCM actuator, including one or more magnets 135 and one or more coils 140. As indicated in FIG. 1A, in this example, coils 140 may be affixed with stationary structure 130, whilst magnets 135 may be attached with substrate 125. Camera 100 may conduct regulatable current through coils 140, which may interact with the one or more magnetic fields of magnets 135 to generate motive force (e.g., Lorentz force) to control the movement of image sensor 115. The movement of image sensor 110 relative to the optical components (e.g., lenses 105 and light folding element 110) in the X- and/or Y-axis may be used to implement an OIS function. In some embodiments, camera 100 may include one or more additional suspension structures and/or one or more additional actuators (not shown) that may allow image sensor 110 to move relative to the optical components approximately along the Z-axis to perform an AF function.

In some embodiments, optical components holder 160 of camera 100 may be formed using an insert molding process. In an insert molding process, a pre-formed part, often a metal, of a certain geometry shape and/or dimension may be loaded into a mold where the pre-formed part is then molded together with a thermoplastic resin to create optical components holder 160. As indicated in FIG. 1B, in this example, optical components 160 may include metal frame 170 (e.g., a pre-formed metal frame) that may be molded with plastic portion 175. For purposes of illustration, in this example, metal frame 170 is considered to be one single piece. Alternatively, in some embodiments, metal frame 170 may include several metal pieces that may be molded together with plastics. As indicated in FIG. 1B, the portion of optical components holder 160 holding light folding element 115 (e.g., piece 164) may include upper wall 180 and at least one side wall 185. In this example, upper wall 180 is positioned in the X-Y plane (orthogonal to the optical axis (or Z-axis)) above an upper side of light folding element 110 that faces lenses 105, whilst side wall 185 is adjacent and connected with upper wall 180 and positioned within the Y-Z plane (parallel to the optical axis (or Z-axis)) on two opposite sides of upper wall 180.

In some embodiments, at least a portion of upper wall 180 may not necessarily include a plastic portion, but rather be formed by a portion of metal frame 170 itself, as indicated in FIG. 1C. As a result, a thickness (or height) of upper 180 along the optical axis (or Z-axis) may be reduced. In some embodiments, compared to other designs that use all plastics to form the upper wall, the thickness (or height) of upper 180 along the optical axis (or Z-axis) may be decreased by several-hundred microns. Further, in some embodiments, the side wall 185 of metal frame 170 may include one or more vertical portions 183 that extend (e.g., in a direction parallel to the optical axis (or Z-axis)) at least partially into the first piece 162 (e.g., the cylindrical section) that holds lenses 105. In some embodiments, the corner at the connection between the first piece 162 and the second piece 164 of optical components holder 160 may bear a relatively large stress and become prone to cracks. Thus, the extension of metal frame 170 may enforce the strength at the connection and prevent cracking.

Figure 2A:
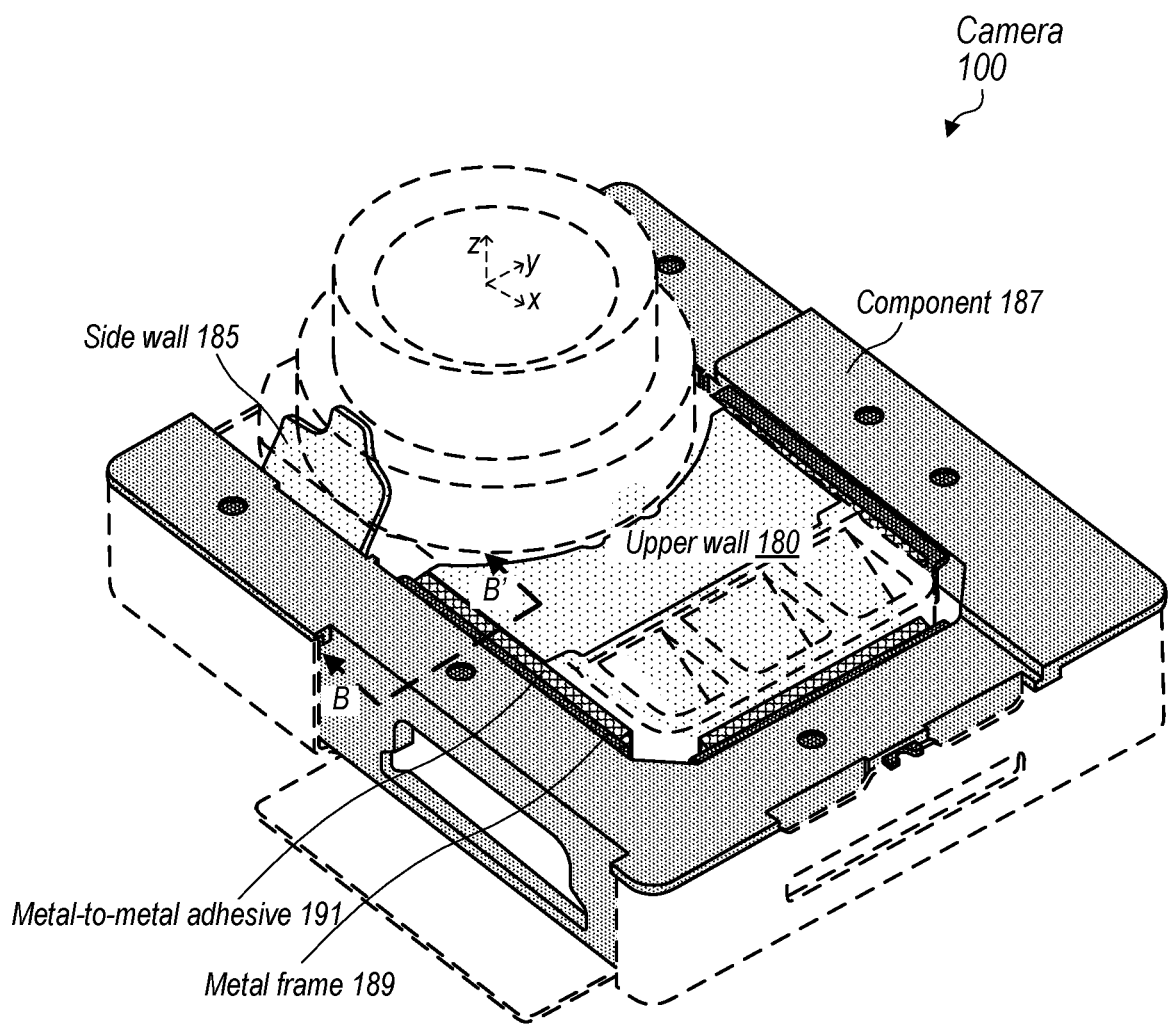
FIGS. 2A-2C show an example optical components holder of a camera that is attached with another component of the camera, according to some embodiments.
Figure 2B:
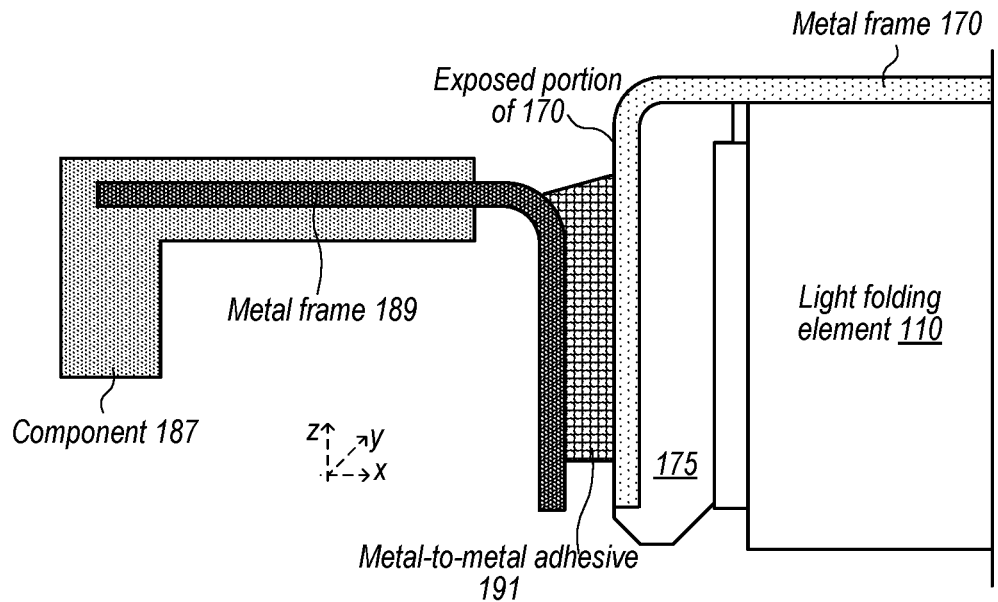
Figure 2C:
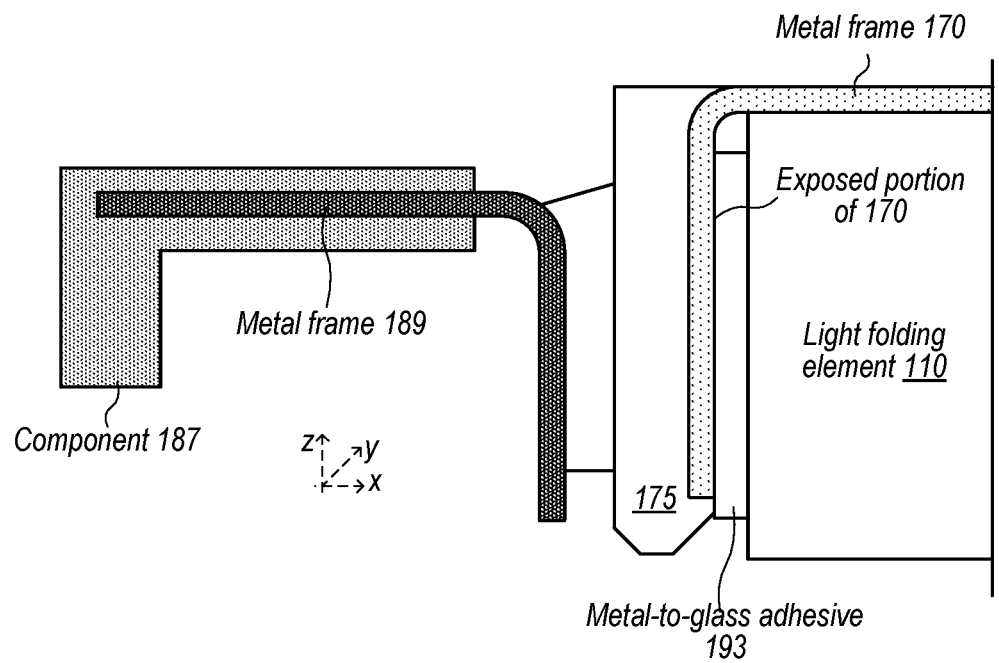

FIGS. 2A-2C show an example optical components holder of a camera that is attached with another component of the camera, according to some embodiments. As indicated in the figures, in some embodiments, optical components holder 160 may be attached with another component 187 of camera 100. In this example, component 187 may have a geometry shape approximately like a can, wrapping up at least a portion of optical components holder 160 from outside (thus only a portion of optical components holder 160 is visible in FIG. 2A). In some embodiments, component 187 may be part of stationary structure 130 of camera 100, or may be affixed with, directly or indirectly, stationary structure 130. Either case, optical components holder 160 may become fixedly coupled with stationary structure 130 and not supposed to move during normal operations of camera 100. As indicated in FIGS. 2B-2C, in some embodiments, component 187 may also include metal frame 189, such as a metal frame insert-molded into component 187. In some embodiments, a portion of metal frame 170 may be at least partially exposed from side wall 185. In other words, the at least partially exposed portion of metal frame 170 may be visible from outside side wall 185. As indicated in FIG. 2B, in some embodiments, the at least partially exposed portion of metal frame 170 may face metal frame 189 of component 187. As a result, optical components holder 160 may be attached with component 187, using metal-to-metal adhesive 191 applied to the at least partially exposed portion of metal frame 170 and the corresponding portion of metal frame 189 of component 189. In contrast to other optical components holders without the at least partially exposed metal frame (or not including an insert-molded metal frame) that require metal-to-plastics adhesives, metal-to-metal adhesive 191 may provide a stronger bonding connection for optical components holder 160 and component 187. Alternatively, as shown in FIG. 2C, in some embodiments, the at least partially exposed portion of metal frame 170 may face light folding element 110. In some embodiments, light folding element 110 may be made of glass. Thus, compared to other plastic optical components holders requiring plastic-to-glass adhesives, it may now be possible to use metal-to-glass adhesive 193 to affix light folding element 110 with optical components holder 160 (through the at least partially exposed portion of metal frame 170) to get a stronger attachment.

Figure 3A:
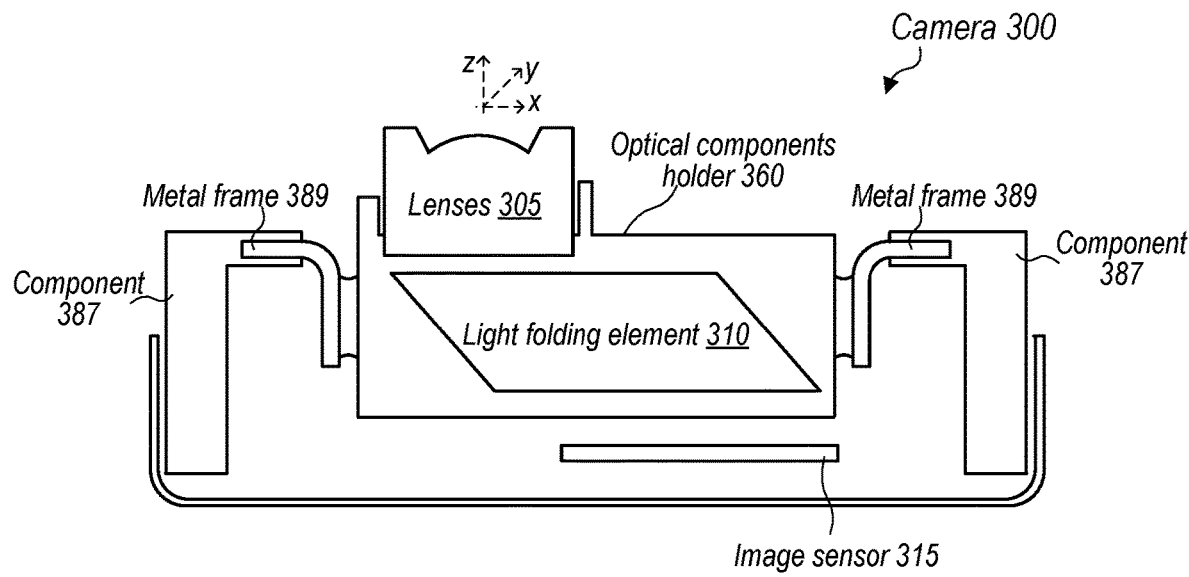
FIGS. 3A-3B show an example camera where an optical components holder is attached with another component of the camera with compliant mounts, according to some embodiments.
Figure 3B:
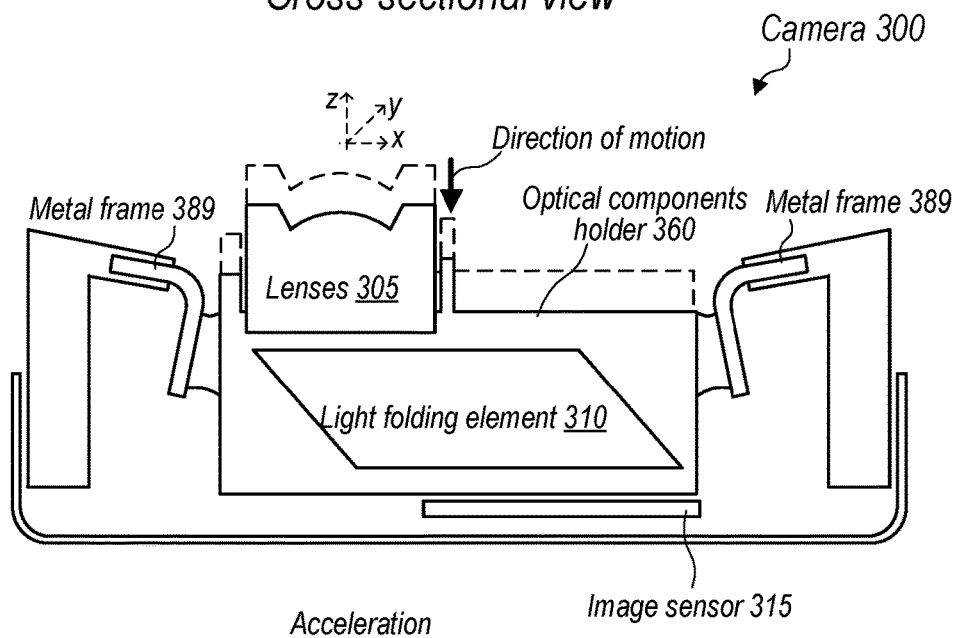

In some embodiments, the optical components holder of a camera may be attached with the other component of the camera at a plurality of positions, and stiffness of the attachment at the plurality of positions may be determined based on a mass distribution of the optical components holder and the optical components held within the optical components holder, so as to provide a translational motion between the one or more lenses and the light folding element during movement. FIGS. 3A-3B show an example camera where an optical components holder is attached with another component of the camera with compliant mounts, according to some embodiments. As indicated in the figures, camera 300 may include a group of optical components, such as one or more lenses 305 and light folding element 310, and image sensor 315. In some embodiments, the group of optical components (e.g., lenses 305 and light folding element 310) may be held within optical components holder 360.

As indicated in FIG. 3A, optical components holder 360 may be attached with component 387 of camera 300 at the left and right sides of optical components holder 360. In some embodiments, the attachment at the two sides may not necessarily be both rigid connections, but rather be compliant mounts to allow for elastic body deformation. For instance, when the compliant mounts are implemented using at least one metal frame, e.g., metal frame 389 of component 387 of camera 300, metal frame 389 may have mechanical flexibility to be able to stretch and compress. During unwanted moving events, camera 300 (including the optical components such as lenses 315 and light folding elements 310) may move with a sudden acceleration, e.g., in a negative direction of the optical axis (or Z-axis) as indicated in FIG. 3B. The compliant mounts between optical components holder 360 and component 387 using the metal frame 389 may deform during the motion, and thus allow both lenses 315 and light folding elements 310 to move during the moving events. Further, the stiffness (i.e., an inverse of compliance) of the compliant mounts at the two sides may be determined according to a mass distribution of optical components holder 360 and the group of optical components (e.g., lenses 305 and light folding element 310) within optical components holder 360 to provide balanced movement of lenses 305 and light folding elements 310. As a result, lenses 305 and light folding element 310 may move translationally in an approximate linear manner with respect to each other. In other words, lenses 305 and light folding elements 310 may move approximately a same distance towards a same direction (e.g., approximately a same distance in the negative direction of the Z-axis). As a result, a relative position between lenses 305 and light folding element 310 may stay approximately unchanged, such that the two may not collide with each other to cause damages. Note that, in some embodiments, the compliant mounts between an optical components holder and another component of a camera my involve one or more metal frame insert-molded into the optical components holder (e.g., metal frame 170). Thus, in some embodiments, the metal frame of the optical components holder may have mechanical compliance (e.g., mechanical flexibility) and thus be able to deform during the unexpected moving events.

Figure 4A:
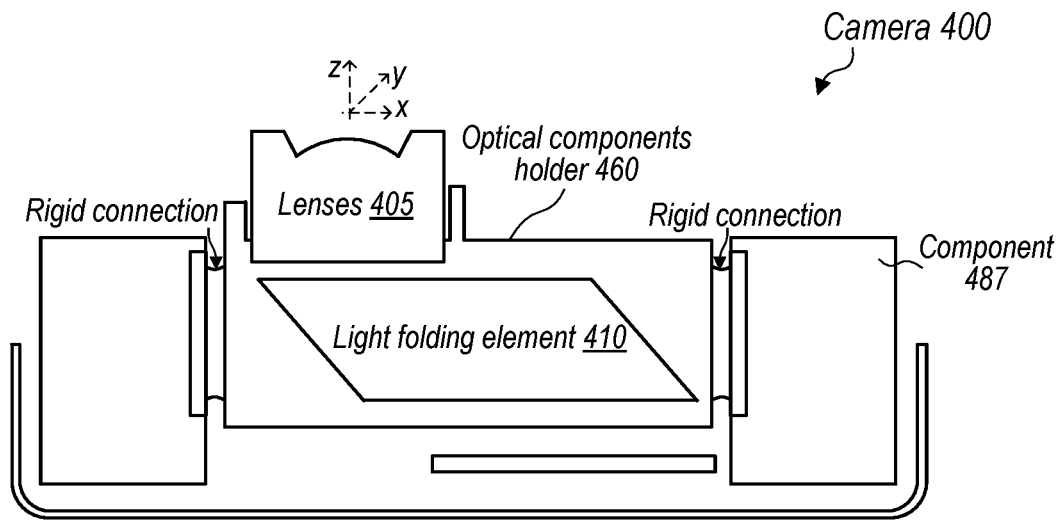
FIGS. 4A-4B show another example cameras where an optical components holder is attached with another component of the camera without compliant mounts, according to some embodiments.
Figure 4B:
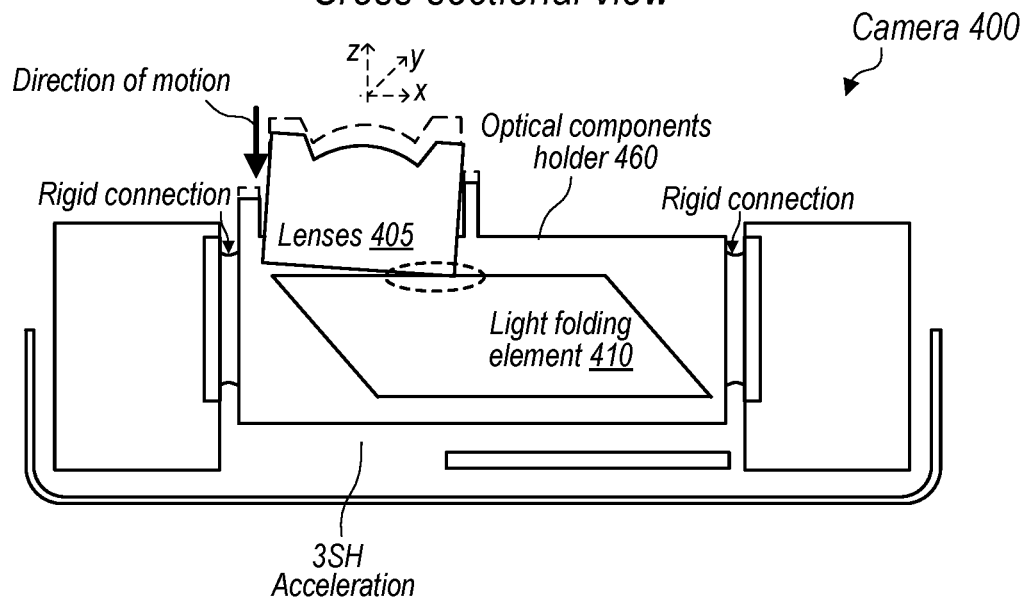

FIGS. 4A-4B and FIGS. 5A-5B show other example cameras where an optical components holder is attached with another component of the camera without compliant mounts, according to some embodiments. For purposes of illustration, FIGS. 4A-4B and FIGS. 5A-5B are provided as a comparison to the example (with compliant mounts) in FIGS. 3A-3B. In FIGS. 4A-4B, the attachment between optical components holder 460 and component 487 of camera 400 are both rigid connections. As a result, during an acceleration event, when camera 400 moves in the negative direction of the optical axis (or Z-axis), light folding element 410 may tend to stay at a fixed position (assuming that it is attached with optical components holder 460 that is further rigidly connected with stationary component 487), whilst lenses 405 may move in the negative Z-direction and collide with light folding element 410 to cause damages (as indicated by the dashed circle).

Figure 5A:
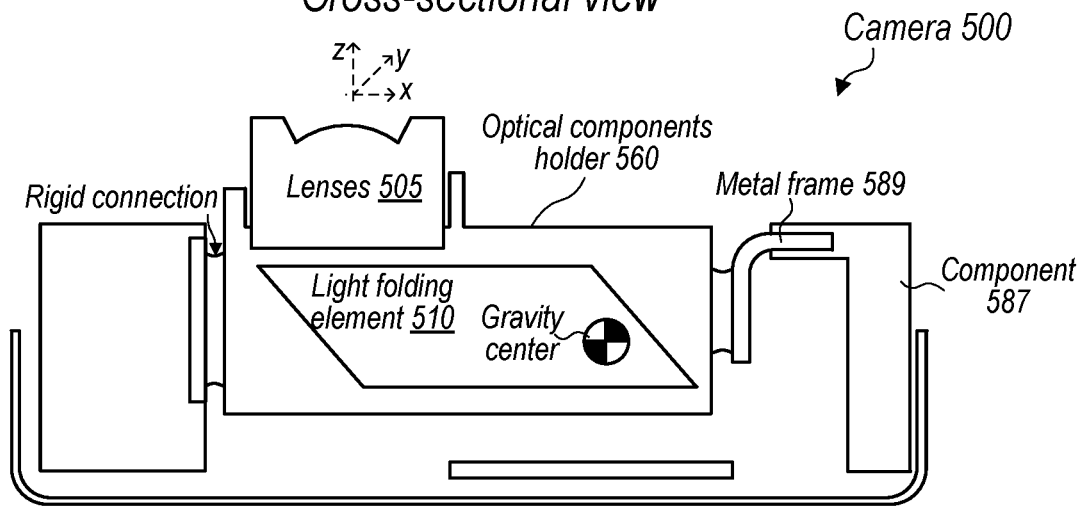
FIGS. 5A-5B show yet another example cameras where an optical components holder is attached with another component of the camera without compliant mounts, according to some embodiments.
Figure 5B:
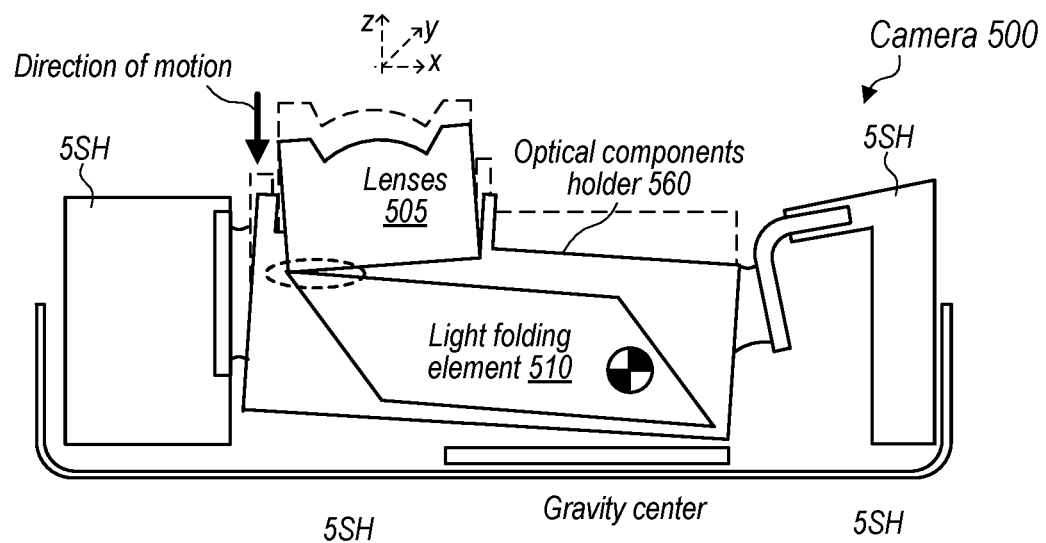

Similarly, in FIGS. 5A-5B, the stiffness of the mounts between optical components holder 560 and component 587 of camera 500 may not necessarily be determined based on a mass distribution of optical components holder 560 and the group of optical components (e.g., lenses 505 and light folding elements 510) within optical components holder 560. For instance, as indicated in FIG. 5B, the gravity center of optical components holder 560 and the group of optical components leans to the right (e.g., the right portion of the optical components is heavier than the left portion), but the attachment at the left side is a rigid connection, and the attachment at the right side is a compliant connection (e.g., a "soft" connection). As a result, when camera 500 moves in the negative Z-direction, although both lenses 505 and light folding element 510 move, they may not necessarily move translationally in a linear manner with each other. As a result, lenses 505 and light folding element 510 may collide with each other and cause damages (as indicated by the dashed circle).

Figure 6A:
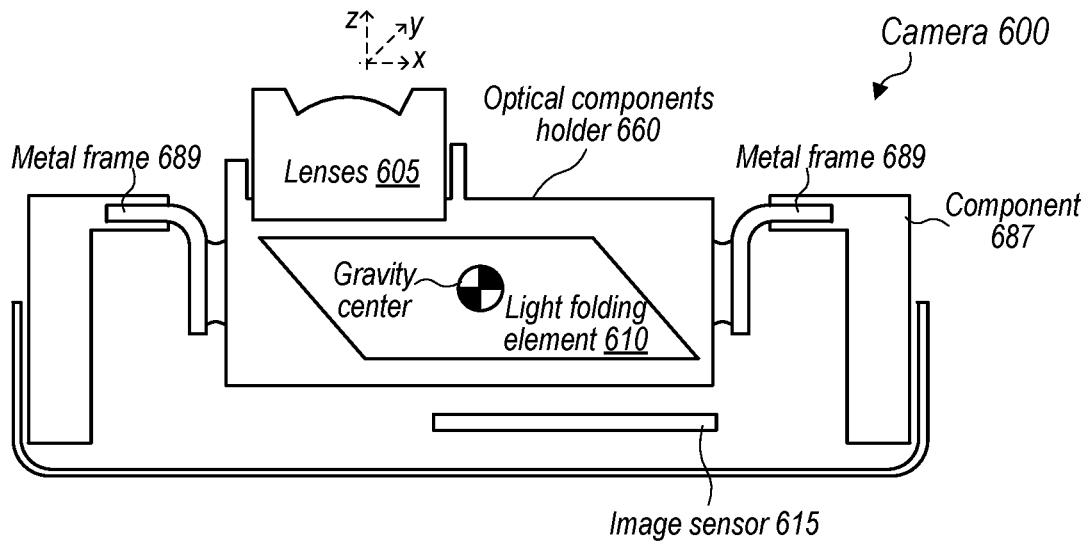
FIGS. 6A-6B show an example scenario during an acceleration event, according to some embodiments.
Figure 6B:
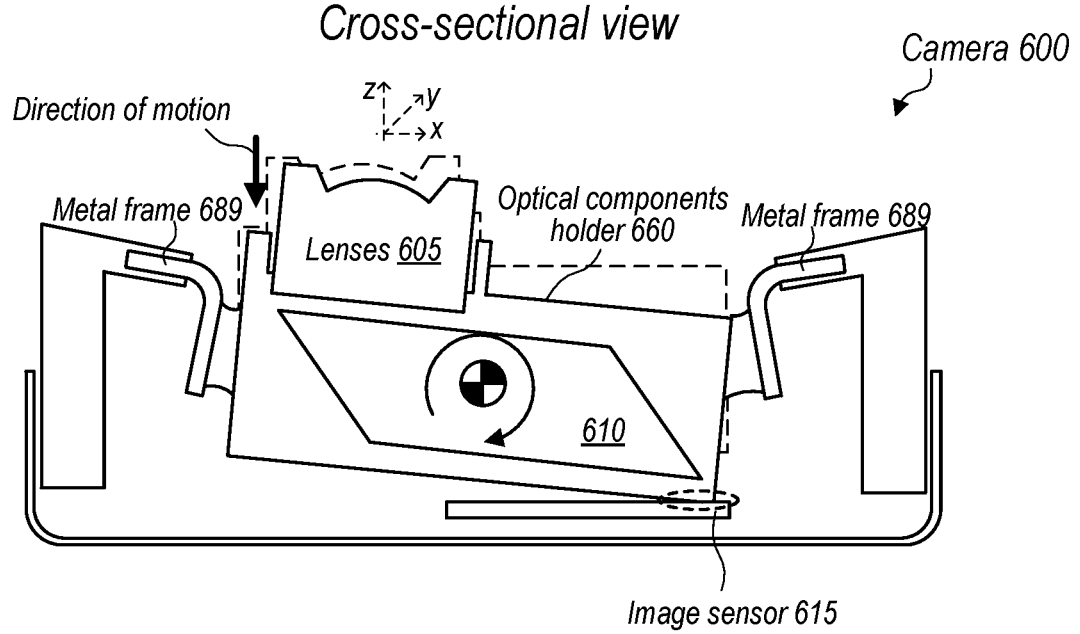

Thus, a primary purpose of the above stiffness design may be to optimize the stiffness of the attachment between the optical components holder and the other component of the camera at the plurality of positions corresponding to a mass distribution (e.g., the position of the gravidity center) of the optical components holder and the optical components within the optical components holder. As a result, the gravity center of the optical components holder and the optical components may remain at approximately the same position during their movement. FIGS. 6A-6B and FIGS. 7A-7B show example scenarios during an acceleration event with different designs of stiffness at the compliant mounts, according to some embodiments. In FIG. 6A-6B, the gravity center of optical components holder 660 and the optical components within component 660 (e.g., one or more lenses 605 and light folding element 610) of camera 600 may be positioned approximately at the geometric center of the optical components. Further, the attachment between optical components holder 660 and component 687 of camera 600 at both left and right sides may have compliance, e.g., metal frame 689 of component 687 may have mechanical flexibility to be able to stretch and compress. Thus, if the stiffness of the compliant mounts at the left and right sides is adjusted according to the mass distribution of optical components holder 660 and the optical components (e.g., lenses 605 and light folding element 610) within optical components holder 660, the stiffness of the compliant mounts at the two sides may be equal with each other. As a result, during the acceleration event, light folding element 610 may stay approximately stationary relative to lenses 605. However, in this example, the stiffness of the attachment at the right is less than that at the left. As a result, when camera 600 moves in the negative direction of the optical axis (or Z-axis), light folding element 610 may tilt clockwise to the right side that has a "softer" mount, as indicated in FIG. 6B. In a worse case, light folding element 610 may rotate so much to collide with image sensor 615 (as indicated by the dashed circle).

Figure 7A:
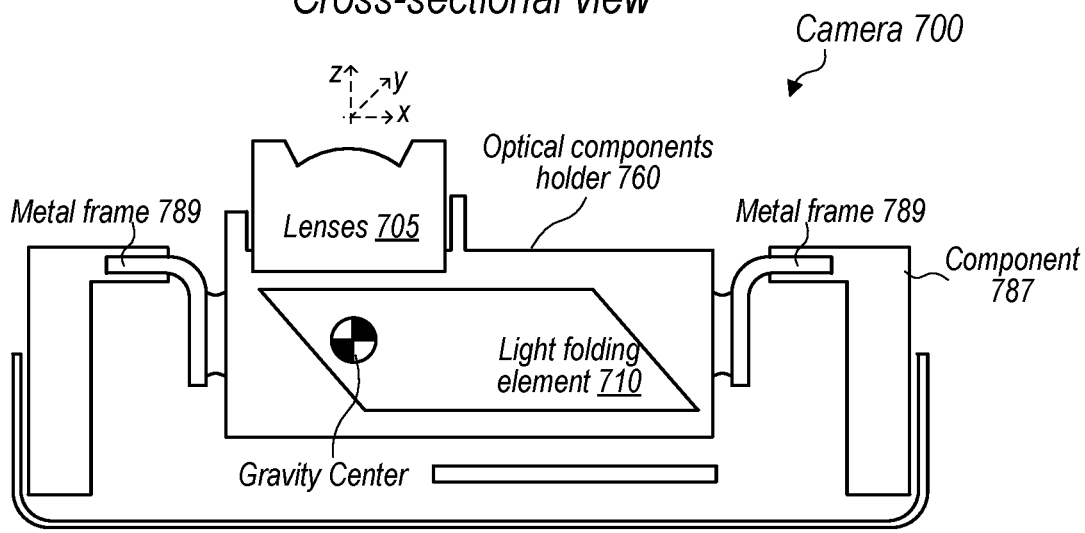
FIGS. 7A-7B show another example scenario during an acceleration event, according to some embodiments.
Figure 7B:
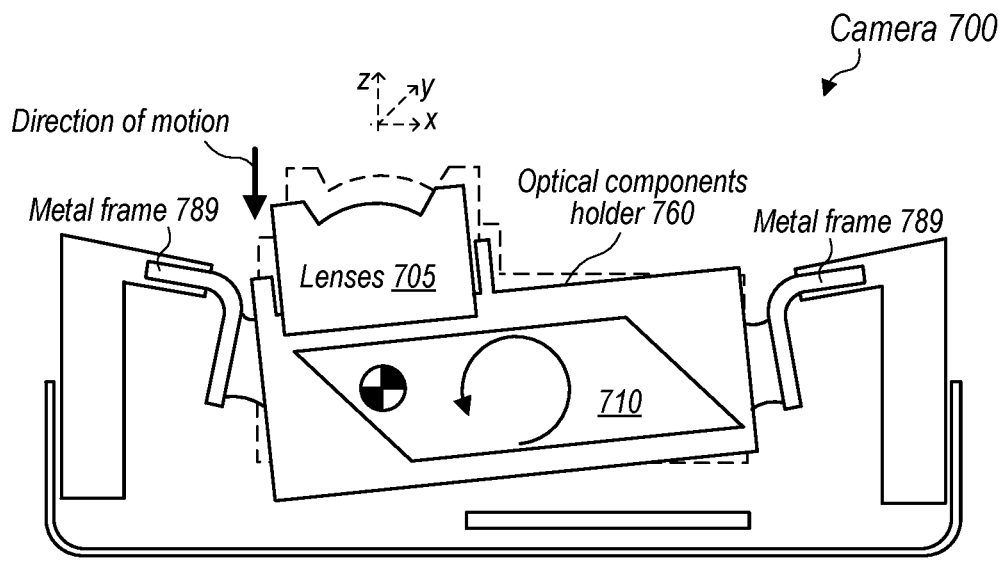

Similarly, in FIGS. 7A-7B, the gravity center of optical components holder 760 and the optical components (e.g., one or more lenses 705 and light folding element 710) of camera 700 may lean to the left. In this example, the mounts between optical components holder 760 and component 787 of camera 700 at the left and right sides may be compliant mounts, e.g., metal frame 789 of component 787 may have mechanical flexibility to be able to deform. Thus, if the stiffness of the compliant mounts at the two sides is designed based on the mass distribution of optical components holder 760 and the optical components within optical components holder 760, the stiffness at the left may be larger than that of the right side. However, in this example, the stiffness of the attachment at the two sides are equal with each other. As a result, when camera 700 moves in the negative direction of the optical axis (or Z-axis), light folding element 710 may tilt counter-clockwise to the heavier side, as indicated in FIG. 7B.

Figure 8A:
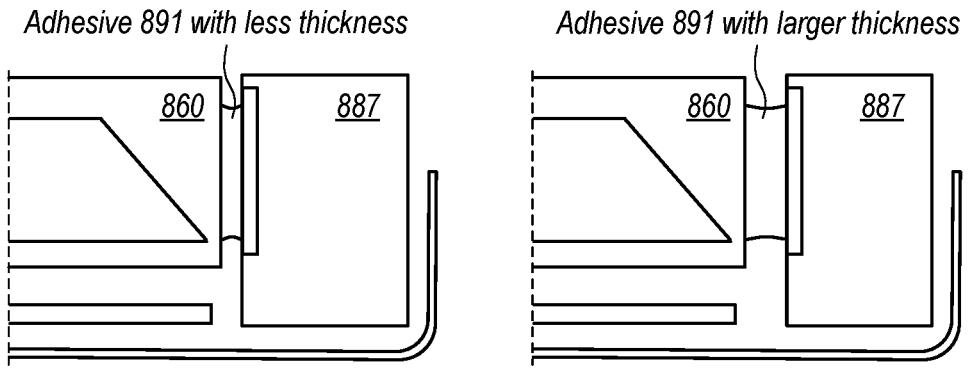
FIGS. 8A-8D show example approaches to adjust stiffness of mounts, according to some embodiments.

In some embodiments, the stiffness of compliant mounts at a plurality of positions may be adjusted in various approximate approaches. FIGS. 8A-8D show example approaches to adjust the stiffness of compliant mounts, according to some embodiments. As indicated in FIG. 8A, in some embodiments, the stiffness of the mount at a position may be adjusted by adjusting the thickness of an adhesive at the position, when the mount at the position is a rigid connection using glue. For instance, the thickness of adhesive 891 applied to glue optical components holder 860 and component 887 of a camera may be increased to increase the bonding strength and thus increase the stiffness of the mount at this joint. Vice versa, the thickness of adhesive 891 may be decreased to reduce the stiffness of the mount at a position.

Figure 8B:
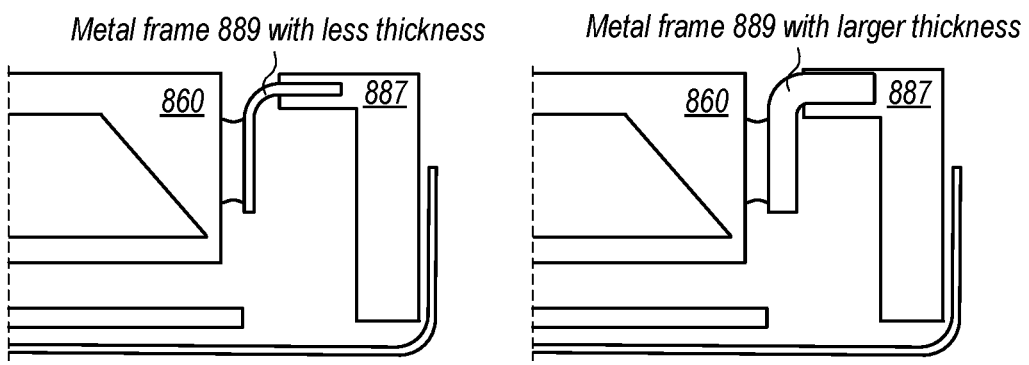

Alternatively, as indicated in FIG. 8B, the mount between optical components holder 860 and component 887 of the camera at a position may be implemented using one or more metal frames, e.g., metal frame 889 insert-molded in to component 887. Thus, in some embodiments, the stiffness of the mount at a position may be adjusted by adjusting the thickness of metal frame 889 at the position. For instance, the thickness of metal frame 889 may be increased to make the portion of metal frame 889 at the joint stronger and thus the stiffness of the mount at this position larger. Alternatively, in some embodiments, the stiffness of a mount at the position may be adjusted by using a different metallic material for metal frame 889. As described above, in some embodiments, the mount between optical components holder 860 and component 887 may be implemented using a metal frame of optical components holder 860 (e.g., metal frame 170 in FIG. 1), or both a metal frame of optical components holder 860 and metal frame 889 of component 887 (e.g., using a metal-to-metal adhesive in FIG. 2). Similarly, in those cases, the adjustment of the stiffness of the mount at a position may be implemented by adjusting the thickness of the metal frame of optical components holder 860, or using a different metallic material for the metal frame of optical components holder 860.

Figure 8C:
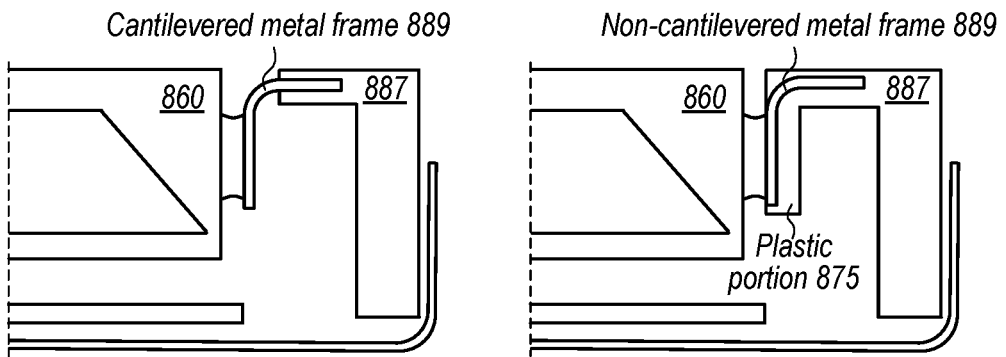

In another example, as indicated in FIG. 8C, the mount between optical components holder 860 and component 887 of the camera at a position may still be implemented using metal frame 889 of component 887, like FIG. 8B. However, in this example, the extended portion of metal frame 889 that is used to attach optical components holder 860 and component 887 may not necessarily be cantilevered like in FIG. 8C, but instead insert-molded with plastic portion 875. Plastic portion 875 may enforce the stiffness of the extended portion of metal frame 889, and thus increase the stiffness of the mount at this joint.

Figure 8D:
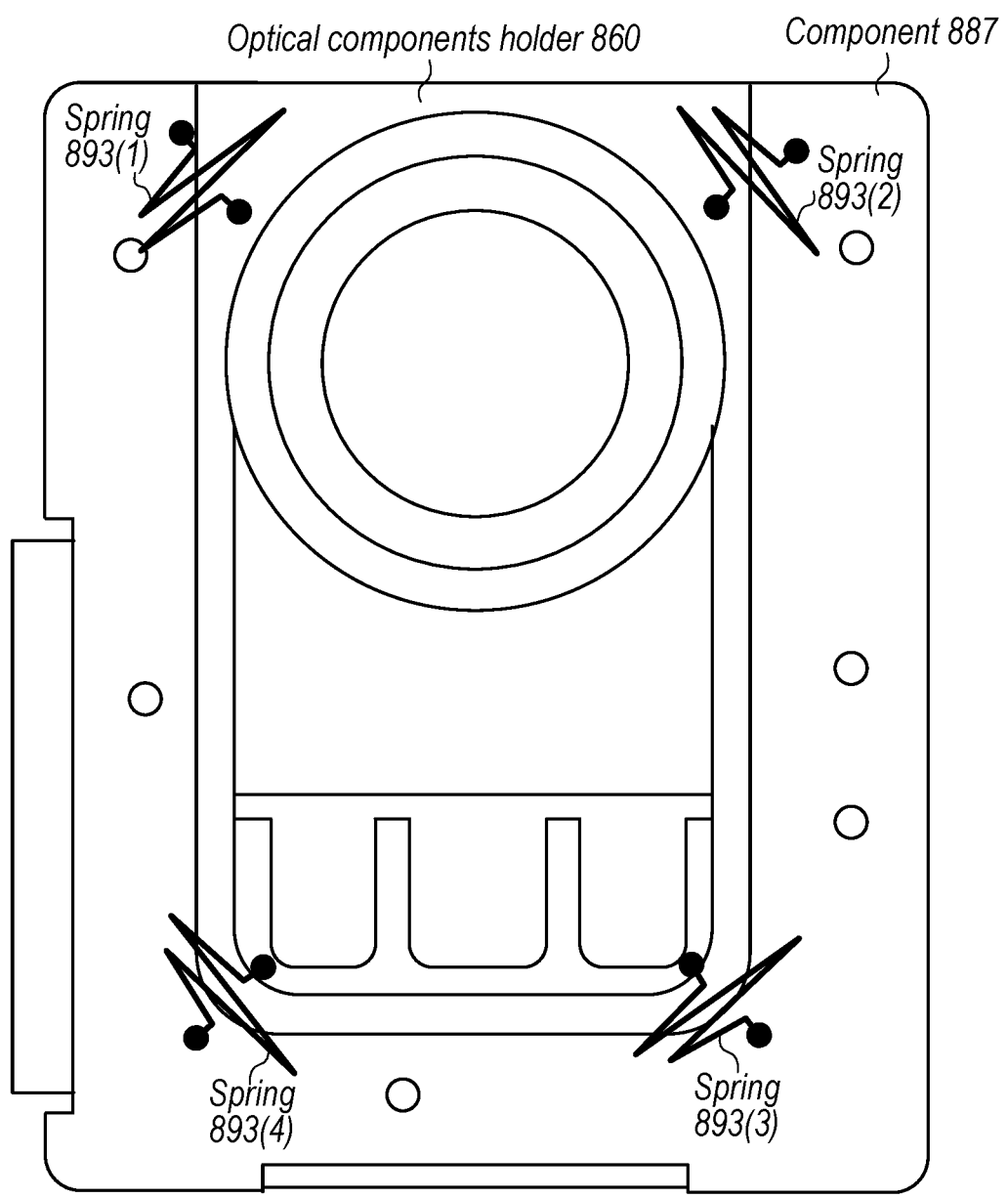

In yet another example, as indicated in FIG. 8D, the mount between optical components holder 860 and component 887 of the camera may also include the use of a plurality of springs 893 respectively at the plurality of positions. Thus, in some embodiments, the stiffness of the mount at the plurality of positions may be adjusted by changing stiffness of individual springs 893.

Figure 9:
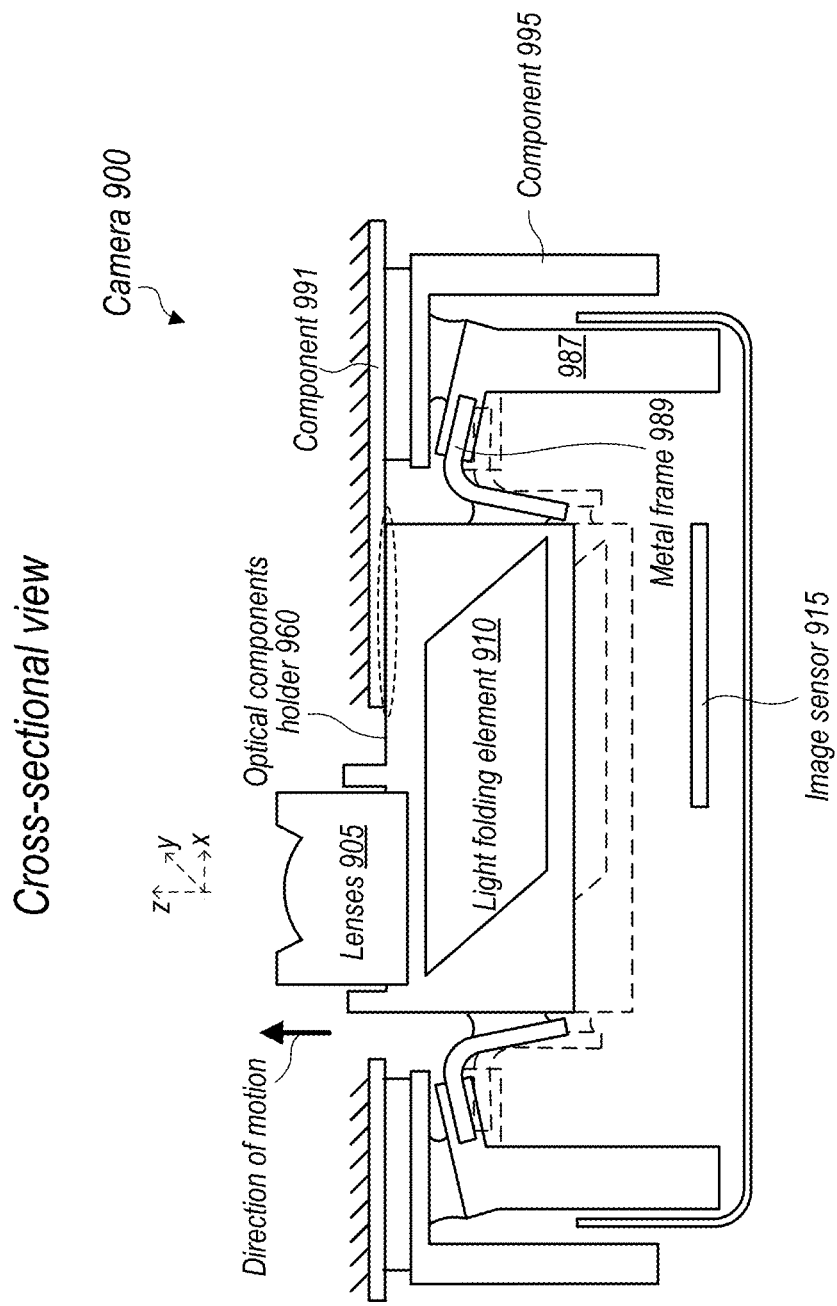
FIG. 9 shows an example camera without the structure to protect an optical components holder from colliding with another component of a camera or a mobile multipurpose device, according to some embodiments.

In some embodiments, during unwanted moving events, the optical components holder of a camera may collide with another component of the camera (e.g., another port component of the camera above the optical components holder) or the mobile multipurpose device (e.g., a smartphone, a tablet, a pad device, and the like) within which the camera is integrated, especially when the attachment between the optical components holder to the camera is compliant and flexible. FIG. 9 shows an example camera without the structure to protect an optical components holder from colliding with another component of a camera or a mobile multipurpose device, according to some embodiments. As indicated in FIG. 9, in some embodiments, camera 900 may include optical components (e.g., one or more lenses 905 and light folding element 910) and image sensor 915. In some embodiments, the optical components may be contained within optical components holder 960. In some embodiments, during unwanted moving events, camera 900 may move unexpectedly, e.g., in a positive direction of the optical axis (or Z-axis). As a result, optical components 960 may move together with camera 900 as well towards the positive direction of the optical axis (or Z-axis). When the attachment between optical components holder 960 and component 987 of camera 900 is compliant attachment (e.g., having flexible elasticity), optical components holder 960 may move even a further distance. In some embodiments, the movement of optical components holder 960 may cause a collision with another component of camera 900 or a mobile multipurpose device within which camera 900 is integrated, e.g., component 991 above optical components holder 960 with respect to the optical axis (or Z-axis), and thus causing damages.

Figure 10:
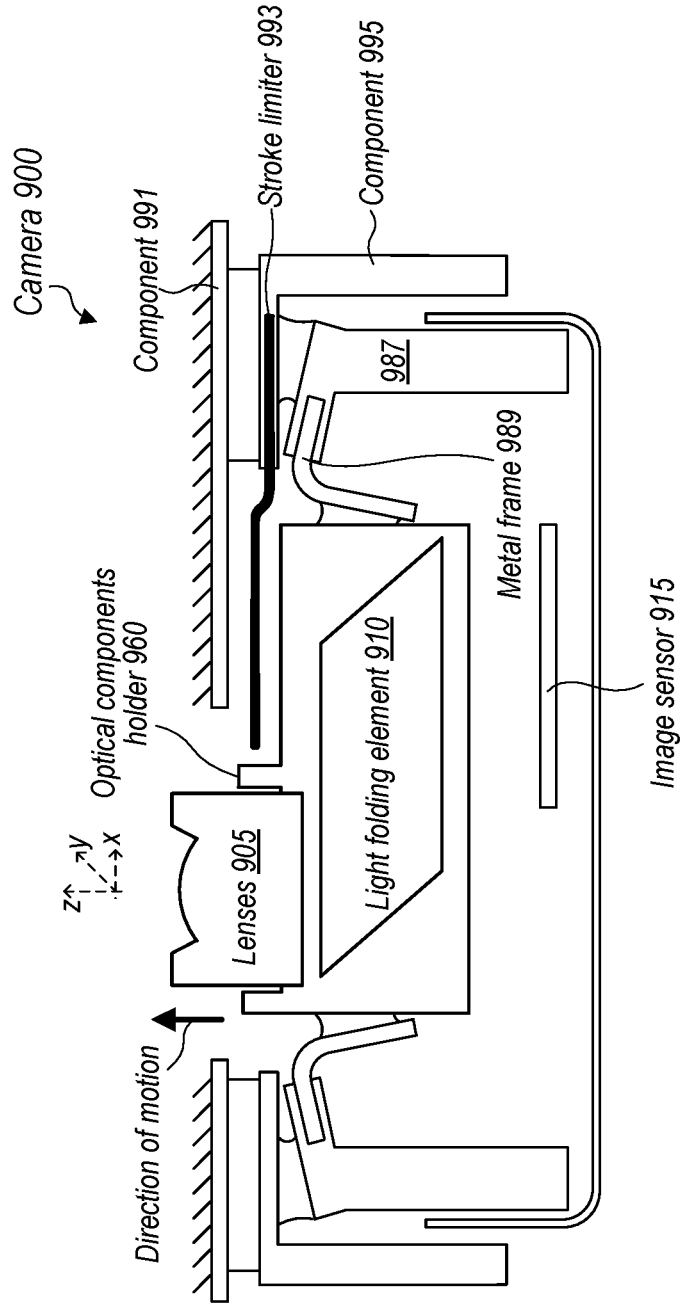
FIG. 10 shows an example camera including a protection structure to protect an optical components holder from colliding with another component of a camera or a mobile multipurpose device, according to some embodiments.

To address the above potential collision, in some embodiments, camera 900 may include a protection structure. FIG. 10 shows an example camera including a protection structure to protect an optical components holder from colliding with another component of a camera or a mobile multipurpose device, according to some embodiments. As indicated in FIG. 10, camera 900 may include an additional stroke limiter 993 positioned between optical components holder 960 and component 991 that optical components holder 960 is protected from colliding with. As a result, when optical components holder 960 moves towards component 991, e.g., in the positive direction of the optical axis (or Z-axis), optical components holder 960 may be stopped by stroke limiter 993 from further movement and thus prevent the collision of optical components holder 960 with component 991. In this example, stroke limiter 993 may be positioned approximately in the X-Y plane orthogonal to the optical axis (or Z-axis). Further, in some embodiments, stroke limiter 993 may be implemented using a metal frame insert-molded into component 995 of camera 900. But note that FIG. 9 is only an example provided for purposes of illustration. Also, depending on the design of camera 900, in some embodiments, stroke limiter 993 may extend in another orientation.

Figure 11:
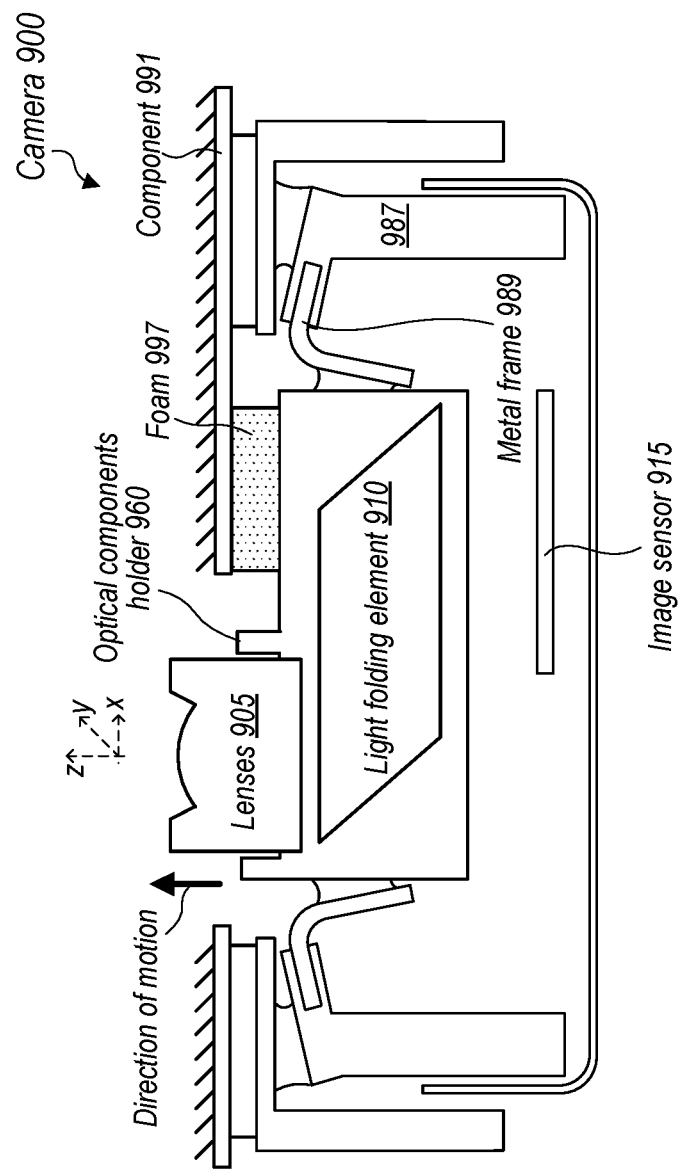
FIG. 11 shows another example camera including a protection structure to protect an optical components holder from colliding with another component of a camera or a mobile multipurpose device, according to some embodiments

FIG. 11 shows another example camera including a protection structure to protect an optical components holder from colliding with another component of a camera or a mobile multipurpose device, according to some embodiments. Unlike FIG. 10, in the example in FIG. 11, camera 900 may include one or more foams placed between optical components holder 960 and component 991 that optical components holder 960 is protected from colliding with. As a result, when optical components holder 960 moves towards component 991, e.g., in the positive direction of the optical axis (or Z-axis), foams 997 may compress and exert a force upon optical components holder 960 like a spring, and thus stop the movement of optical components holder 960 before it collides with component 991 of camera 900.

Figure 12:
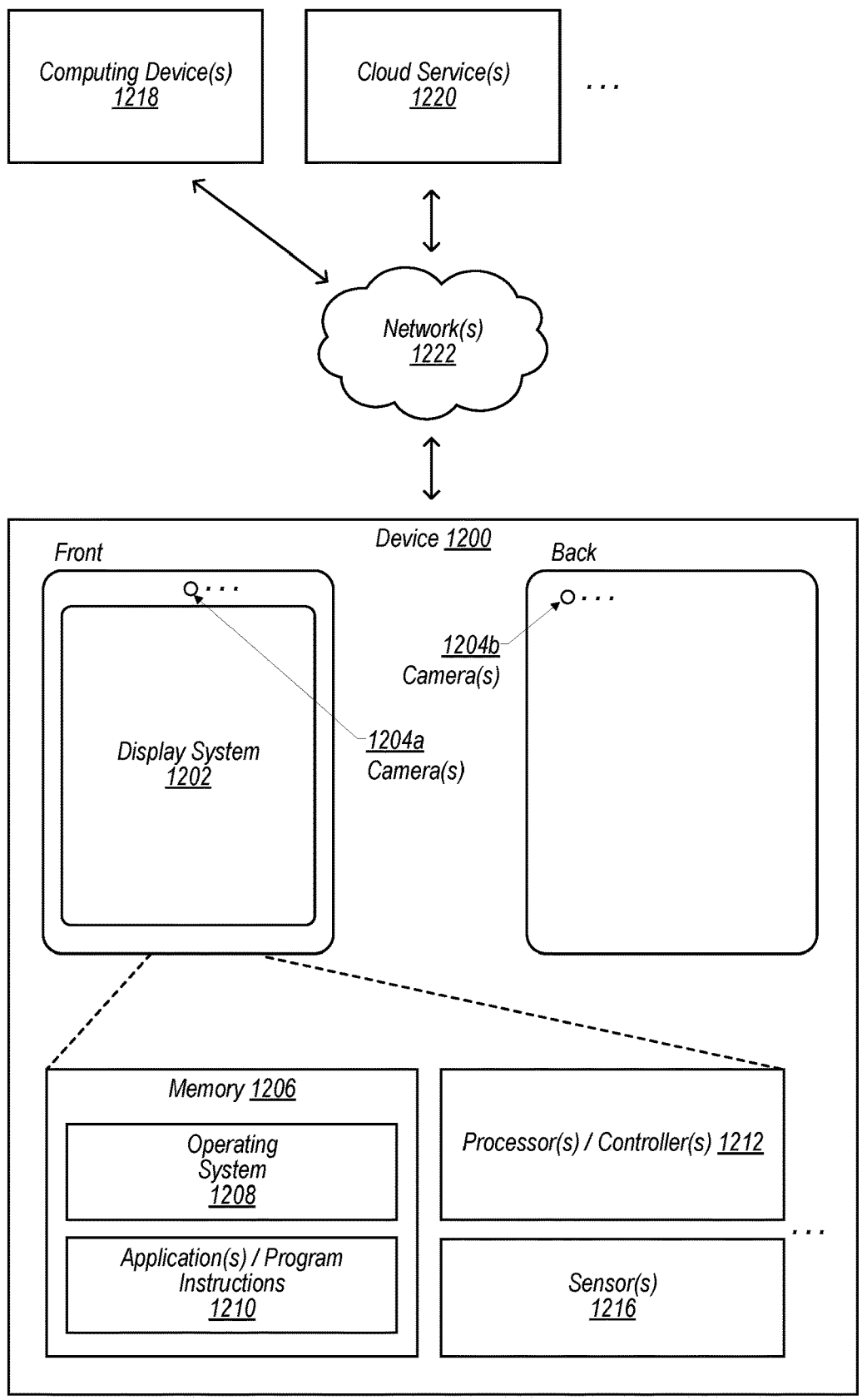
FIG. 12 shows a schematic representation of an example device that may include a camera having an optical components holder for holding optical components, according to some embodiments.

FIG. 12 illustrates a schematic representation of an example device 1200 that may include a camera having an optical components holder for holding optical components, e.g., as described above, according to some embodiments. In some embodiments, the device 1200 may be a mobile device and/or a multifunction device. In various embodiments, the device 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1200 may include a display system 1202 (e.g., comprising a display and/or a touch-sensitive surface) and/or one or more cameras 1204. In some non-limiting embodiments, the display system 1202 and/or one or more front-facing cameras 1204*a* may be provided at a front side of the device 1200, e.g., as indicated in FIG. 12. Additionally, or alternatively, one or more rear-facing cameras 1204*b* may be provided at a rear side of the device 1200. In some embodiments comprising multiple cameras 1204, some or all of the cameras may be the same as, or similar to, each other. Additionally, or alternatively, some or all of the cameras may be different from each other. In various embodiments, the location(s) and/or arrangement(s) of the camera(s) 1204 may be different than those indicated in FIG. 12.

Among other things, the device 1200 may include memory 1206 (e.g., comprising an operating system 1208 and/or application(s)/program instructions 1210), one or more processors and/or controllers 1212 (e.g., comprising CPU(s), memory controller(s), display controller(s), and/or camera controller(s), etc.), and/or one or more sensors 1216 (e.g., orientation sensor(s), proximity sensor(s), and/or position sensor(s), etc.). In some embodiments, the device 1200 may communicate with one or more other devices and/or services, such as computing device(s) 1218, cloud service(s) 1220, etc., via one or more networks 1222. For example, the device 1200 may include a network interface (e.g., network interface 1310) that enables the device 1200 to transmit data to, and receive data from, the network(s) 1222. Additionally, or alternatively, the device 1200 may be capable of communicating with other devices via wireless communication using any of a variety of communications standards, protocols, and/or technologies.

Figure 13:
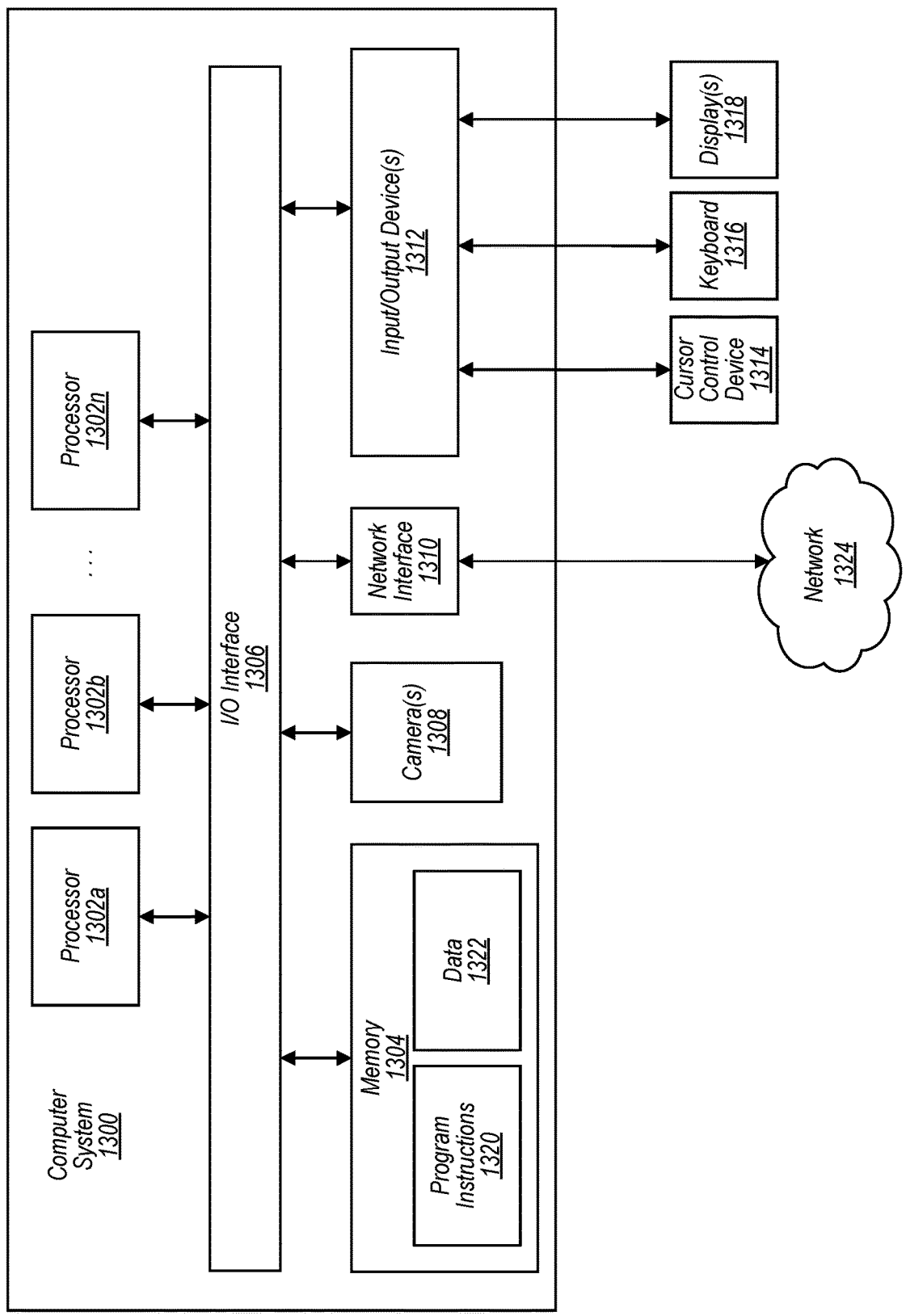
FIG. 13 shows a schematic block diagram of an example computer system that may include a camera having an optical components holder for holding optical components, according to some embodiments.

FIG. 13 illustrates a schematic block diagram of an example computing device, referred to as computer system 1300, that may include or host embodiments of a camera including an optical components holder for holding optical components, e.g., as described herein with reference to FIGS. 1-12, according to some embodiments. In addition, computer system 1300 may implement methods for controlling operations of the camera and/or for performing image processing images captured with the camera. In some embodiments, the device 1200 (described herein with reference to FIG. 12) may additionally, or alternatively, include some or all of the functional components of the computer system 1300 described herein.

The computer system 1300 may be configured to execute any or all of the embodiments described above. In different embodiments, computer system 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1300 includes one or more processors 1302 coupled to a system memory 1304 via an input/output (I/O) interface 1306. Computer system 1300 further includes one or more cameras 1308 coupled to the I/O interface 1306. Computer system 1300 further includes a network interface 1310 coupled to I/O interface 1306, and one or more input/output devices 1312, such as cursor control device 1314, keyboard 1316, and display(s) 1318. In some cases, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1302, or a multiprocessor system including several processors 1302 (e.g., two, four, eight, or another suitable number). Processors 1302 may be any suitable processor capable of executing instructions. For example, in various embodiments processors 1302 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 1302 may include additional types of processors, such as graphics processing units (GPUs), application specific integrated circuits (ASICs), etc. In multiprocessor systems, each of processors 1302 may commonly, but not necessarily, implement the same ISA. In some embodiments, computer system 1300 may be implemented as a system on a chip (SoC). For example, in some embodiments, processors 1302, memory 1304, I/O interface 1306 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1304 may be configured to store program instructions 1320 accessible by processor 1302. In various embodiments, system memory 1304 may be implemented using any suitable memory technology, such as static random access memory (SRAM), synchronous dynamic RAM (SDRAM), nonvolatile/Flash-type memory, or any other type of memory. Additionally, existing camera control data 1322 of memory 1304 may include any of the information or data structures described above. In some embodiments, program instructions 1320 and/or data 1322 may be received, sent or stored upon different types of computer-accessible media or on similar media separate from system memory 1304 or computer system 1300. In various embodiments, some or all of the functionality described herein may be implemented via such a computer system 1300.

In one embodiment, I/O interface 1306 may be configured to coordinate I/O traffic between processor 1302, system memory 1304, and any peripheral devices in the device, including network interface 1310 or other peripheral interfaces, such as input/output devices 1312. In some embodiments, I/O interface 1306 may perform any necessary protocol, timing or other data transformations to convert data signals from one component (e.g., system memory 1304) into a format suitable for use by another component (e.g., processor 1302). In some embodiments, I/O interface 1306 may include support for devices attached through various types of peripheral buses, such as a variant of the Peripheral Component Interconnect (PCI) bus standard or the Universal Serial Bus (USB) standard, for example. In some embodiments, the function of I/O interface 1306 may be split into two or more separate components, such as a north bridge and a south bridge, for example. Also, in some embodiments some or all of the functionality of I/O interface 1306, such as an interface to system memory 1304, may be incorporated directly into processor 1302.

Network interface 1310 may be configured to allow data to be exchanged between computer system 1300 and other devices attached to a network 1324 (e.g., carrier or agent devices) or between nodes of computer system 1300. Network 1324 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1310 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1312 may, in some embodiments, include one or more display terminals, keyboards, keypads, touchpads, scanning devices, voice or optical recognition devices, or any other devices suitable for entering or accessing data by one or more computer systems 1300. Multiple input/output devices 1312 may be present in computer system 1300 or may be distributed on various nodes of computer system 1300. In some embodiments, similar input/output devices may be separate from computer system 1300 and may interact with one or more nodes of computer system 1300 through a wired or wireless connection, such as over network interface 1310.

Those skilled in the art will appreciate that computer system 1300 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   an image sensor;
   a group of optical components, including:
      one or more lenses; and
      a light folding element configured to fold light that passes through the one or more lenses to the image sensor; and an optical components holder, including:
  a first portion configured to hold the light folding element, the first portion including:
    an upper wall covering a portion of an upper side of the light folding element facing the one or more lenses, the upper wall including one portion of a metal frame; and
    a side wall adjacent the upper wall, the side wall including another portion of the metal frame, wherein the other portion of the metal frame is at least partially exposed from the side wall.

2. The system of claim 1, wherein the first portion of the optical components holder is formed using an insert molding process such that the metal frame is molded together with one or more plastic portions of the first portion of the optical components holder.

3. The system of claim 2, wherein the at least partially exposed other portion of the metal frame is molded with a first plastic portion of the first portion of the optical components holder, wherein the at least partially exposed other portion of the metal frame faces another metal frame of another component, and wherein the at least partially exposed other portion of the metal frame is attached with the other metal frame using an adhesive.

4. The system of claim 2, wherein the at least partially exposed other portion of the metal frame is molded with a first plastic portion of the first portion of the optical components holder, wherein the at least partially exposed other portion of the metal frame faces the light folding element, and wherein the at least partially exposed other portion of the metal frame is attached with the other metal frame using an adhesive.

5. The system of claim 1, wherein the upper wall does not include another portion of another material except the one portion of the metal frame.

6. The system of claim 1, wherein the one or more lenses of the group of optical components define an optical axis, wherein the upper wall of the first portion of the optical components holder is in a plane orthogonal to the optical axis, and wherein the side wall of the first portion of the optical components holder is in another plane parallel with the optical axis.

7. The system of claim 1, wherein the light folding element is a prism in a parallelogram shape.

8. The system of claim 1, wherein the image sensor is configured to be movable, under control of one or more actuators, relative to the group of optical components in one or more directions.

9. The system of claim 1, further comprising:
  a stroke limiter placed between the optical components holder and another component of the system to prevent the optical components from colliding with the other component of the system.

10. The system of claim 1, further comprising:
  one or more foams placed between the optical components holder and another component of the system to prevent the optical components from colliding with the other component of the system.

11. A device, comprising:
  a camera, including:
    an image sensor;
    a group of optical components, including:
      one or more lenses; and
      a light folding element configured to fold light that passes through the one or more lenses to the image sensor; and
    an optical components holder, including:
      a first portion configured to hold the light folding element, the first portion including:
        an upper wall covering a portion of an upper side of the light folding element facing the one or more lenses, the upper wall including one portion of a metal frame; and
        a side wall adjacent the upper wall, the side wall including another portion of the metal frame, wherein the other portion of the metal frame is at least partially exposed from the side wall; and
  a processor configured to process image signals generated from the image sensor to produce an image.

12. The device of claim 11, wherein the first portion of the optical components holder is formed using an insert molding process such that the metal frame is molded together with one or more plastic portions of the first portion of the optical components holder.

13. The device of claim 12, wherein the at least partially exposed other portion of the metal frame is molded with a first plastic portion of the first portion of the optical components holder, wherein the at least partially exposed other portion of the metal frame faces another metal frame of another component of the camera, and wherein the at least partially exposed other portion of the metal frame is attached with the other metal frame using an adhesive.

14. The device of claim 12, wherein the at least partially exposed other portion of the metal frame is molded with a first plastic portion of the first portion of the optical components holder, wherein the at least partially exposed other portion of the metal frame faces the light folding element, and wherein the at least partially exposed other portion of the metal frame is attached with the other metal frame using an adhesive.

15. The device of claim 11, wherein the upper wall does not include another portion of another material except the one portion of the metal frame.

16. The device of claim 11, wherein the one or more lenses of the group of optical components define an optical axis, wherein the upper wall of the first portion of the optical components holder is in a plane orthogonal to the optical axis, and wherein the side wall of the first portion of the optical components holder is in another plane parallel with the optical axis.

17. The device of claim 11, wherein the light folding element is a prism in a parallelogram shape.

18. The device of claim 11, wherein the image sensor is configured to be movable, under control of one or more actuators, relative to the group of optical components in one or more directions.

19. The device of claim 11, further comprising:
  a stroke limiter placed between the optical components holder and another component of the camera or the device to prevent the optical components from colliding with the other component.

20. The device of claim 11, further comprising:
  one or more foams placed between the optical components holder and another component of the camera or the device to prevent the optical components from colliding with the other component.

* * * * *